Figure 1:
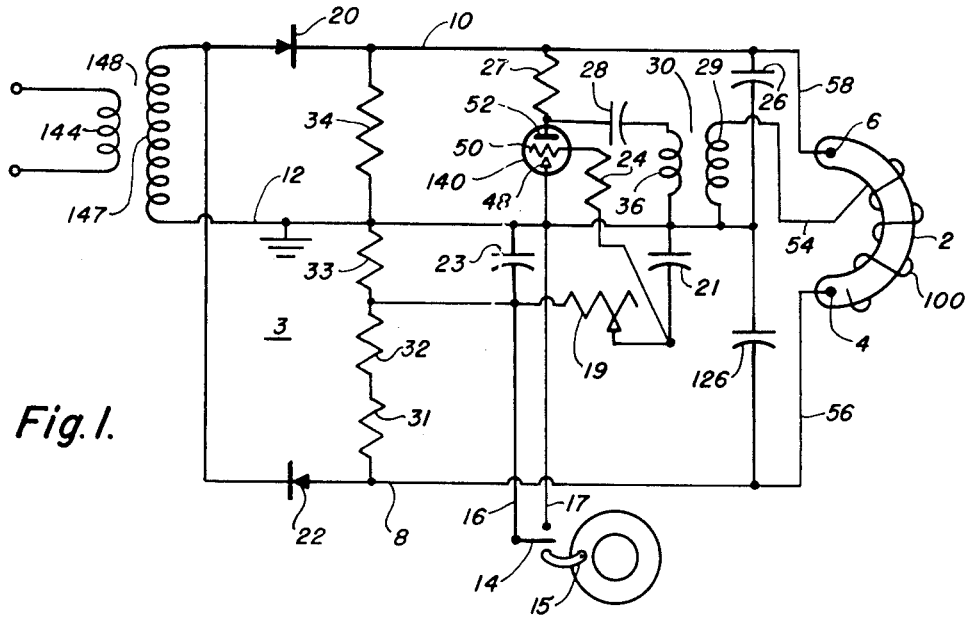

July 24, 1956  K. J. GERMESHAUSEN  2,755,714
FLASH-PHOTOGRAPHY DELAY SYSTEM
Filed April 30, 1951  2 Sheets-Sheet 1

Inventor
Kenneth J. Germeshausen
by Rines and Rines
Attorneys

July 24, 1956  K. J. GERMESHAUSEN  2,755,714
FLASH-PHOTOGRAPHY DELAY SYSTEM
Filed April 30, 1951  2 Sheets-Sheet 2

Inventor
Kenneth J. Germeshausen
by Rines and Rines
Attorneys

United States Patent Office 2,755,714
Patented July 24, 1956

2,755,714
FLASH-PHOTOGRAPHY DELAY SYSTEM

Kenneth J. Germeshausen, Newton Center, Mass.

Application April 30, 1951, Serial No. 223,752

18 Claims. (Cl. 95—11.5)

The present invention relates to systems and apparatus designed for flash-photography, and more particularly to high-speed flash-photography.

Many present-day cameras are provided with chemical flash-bulb attachments for photographing objects, large audiences and like scenes by artificial light. Since the chemical flash-bulbs do not emit their maximum intensity of light until about fifteen to twenty milliseconds after current is first passed through them, these cameras are each provided with a shutter mechanism that, upon being tripped, simultaneously operates a switch for closing the circuit of the flash-bulb, but delays the full opening of the shutter for about fifteen to twenty milliseconds. This type of camera, however, is frequently employed also with electric flash tubes that, unlike chemical flash-bulbs, produce high-intensity light flashes of extremely short duration, which may be of the order of $1/10,000$ of a second or less. Such high-speed flash tubes may, for example, be connected into flash-producing systems of the type described in United States Letters Patent No. 2,408,764, issued on October 8, 1946, to Harold E. Edgerton. To trip the before-described camera-shutter mechanism simultaneously with the triggering of a high-speed flash-producing system of this character would obviously result in producing the high-speed flash of light about fifteen to twenty milliseconds before the full opening of the camera shutter. It is therefore customary to delay the flashing of the high-speed flash tubes for a predetermined interval of time, of the order of fifteen to twenty milliseconds, after the initiation of the operation of the camera-shutter mechanism, with the aid of electromechanical relays and the like.

Such relays, however, are not satisfactory. Among other defects, because they are voltage-sensitive, their operation varies with variations in voltage; and since the mechanical parts associated with the relay are subject to wear and fatigue, the time delay produced by the relay varies with continued use.

An object of the present invention is to provide, in a high-speed flash-producing system of the above-described character, for use with a camera having a normally closed shutter, a new and improved delay system for delaying the flashing of a light source, during the delayed opening of the shutter, a predetermined interval of time after the shutter has become tripped.

A further object is to provide a delay circuit that, over wide operating limits, shall be substantially independent of voltage variations, and shall remain extremely stable, even after long and repeated use.

Other and further objects will be explained hereinafter and will be more particularly pointed out in the appended claims.

The present invention is illustrated as embodied in a flash-producing system of the type in which condenser means, previously charged from a source of energy, is discharged through the flash tube to produce a flash of light for momentarily illuminating an object to be photographed. The moment of discharge is controlled by a suitable switching device. In accordance with the preferred embodiment of the present invention, that is illustrated and described herein, an electric network having a time constant corresponding to the desired predetermined interval of time delay is connected to the switching device in order correspondingly to delay the discharge of the condenser means. The flash is thus delayed until the shutter becomes fully opened. According to a further feature of the invention, means is provided comprising a normally open holding circuit that becomes closed upon the operation of the switching device in order to insure that the delay provided by the electric network shall occur irrespective of possible further operation of the switching device. The invention provides also preferred networks and holding circuits with the aid of which uniform performance may be obtained, irrespective of voltage variations, over a wide range of voltages.

The invention will now be described more fully in connection with the accompanying drawings, Fig. 1 of which is a schematic circuit diagram illustrating a preferred embodiment thereof; Fig. 2 is a similar diagram of a modification; and Fig. 3 is a perspective view of apparatus embodying the circuit of Fig. 1 or Fig. 2.

Figure 3:
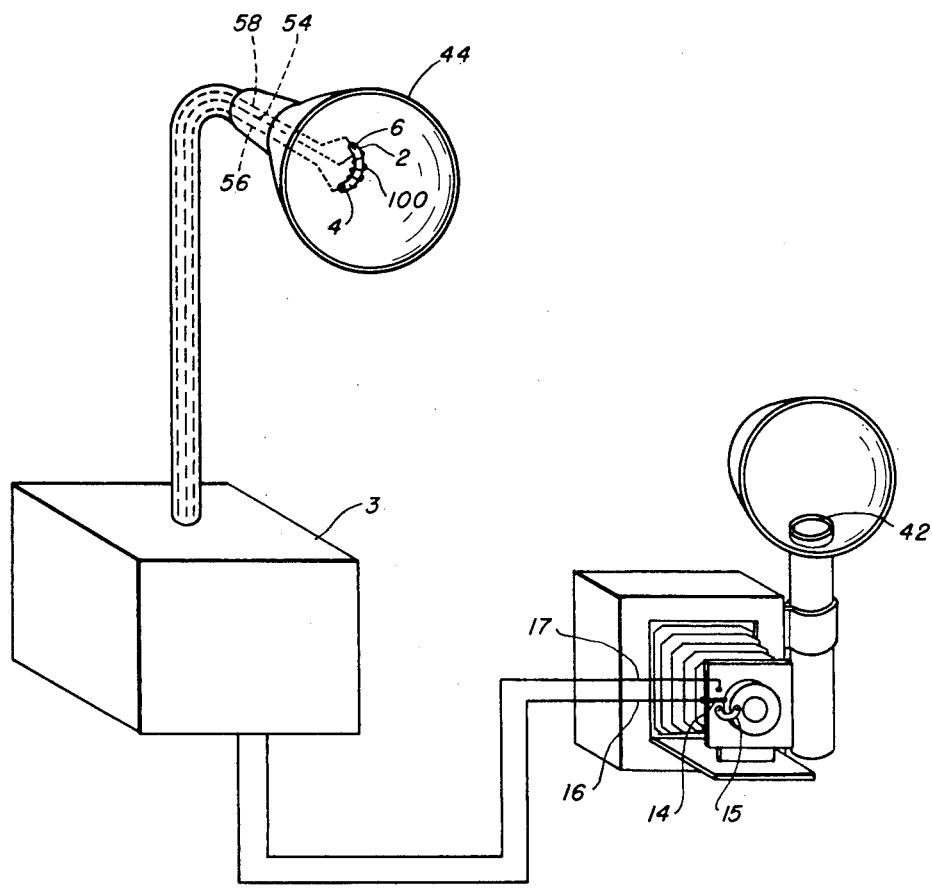

A commercial photographer's camera is illustrated in Fig. 3, provided with a shutter mechanism 15 of the type that, when set into operation by, for example, clockwise rotation, delays the opening of the shutter until a predetermined interval of time has elapsed, usually of the order of fifteen to twenty milliseconds. The camera is designed for operation with a chemical flash-bulb, not shown, seated in a socket 42. Current is supplied to the flash-bulb, not shown, from a battery, not shown, simultaneously with the initiation of the operation of the shutter mechanism 15. The light from the flash-bulb does not reach its peak intensity of illumination until about fifteen to twenty milliseconds after the photographer has initiated the operation of the shutter mechanism 15, at which time the shutter becomes fully open.

In accordance with the present invention, however, this same commercial camera, with its delay shutter mechanism 15 may be used with a high-speed flash-producing system 3 provided with a high-speed flash-lamp 2, of the type, for example, disclosed in the said Letters Patent 2,408,764.

The flash-lamp 2 may be disposed within a reflector 44 that may be oriented toward the object to be photographed. It is shown provided with internal cathode and anode electrodes 4 and 6 and an external control electrode 100.

The voltage between the electrodes 6 and 4 may be built up by charging a pair of condensers 26 and 126 from the secondary winding 147 of a transformer 148 the primary winding 144 of which is supplied with alternating current from the mains. One terminal of the secondary winding 147, shown as the upper terminal, is shown connected through a rectifier 20, as, for example, of the selenium dry-plate type, by way of a conductor 10, to the upper electrode of the condenser 26 and, by way of a conductor 58, to the anode electrode 6 of the flash-lamp 2. This same upper terminal of the secondary winding 147 is shown also connected through a similar rectifier 22, oriented in reverse polarity to the polarity of the rectifier 20, and by way of a conductor 8, to the bottom electrode of the condenser 126 and, by way of a conductor 56, to the cathode electrode 4 of the flash-lamp 2. The bottom electrode of the condenser 26 and the upper electrode of the condenser 126 are shown connected together, and to the bottom terminal of the secondary winding 147 by way of a conductor 12, shown grounded. A bleeder resistor 34 is connected in parallel with the condenser 26 and a bleeder-resistor network chain 31, 32, 33 is connected in parallel with the condenser 126. A voltage-doubler power supply is thus provided, for charging the condensers 26 and 126, respectively, positively and negatively, with respect to ground, during opposite half cycles of the alternating voltage supplied the secondary winding 147, to a total voltage of twice the input voltage.

The charged condensers 26, 126 thus normally establish a high voltage between the anode 6 and the cathode 4 that, of itself, however, is not sufficient to produce a discharge through the tube 2. An electrical stimulus or triggering-voltage impulse may be impressed upon the control electrode 100 to effect this discharge, by means of a suitable control circuit. This control circuit is illustrated as embodying a trigger device, such, for example, as thyratron 140, shown provided with a cathode 48, a control grid 50 and an anode or plate 52. The thyratron 140 is shown connected in parallel with the condenser 26 by a connection of its cathode 48 to the grounded conductor 12 and its plate 52, through a resistor 27, to the conductor 10.

The thyratron 140 is normally held non-conductive or open-circuited by means of a negative bias applied to its control electrode 50 from the lower terminal of the bleeder resistor 33 and through a variable resistor 19 and a resistor 24. It may be rendered conductive, however, by the discharge of a trigger condenser 28. The condenser 28 and a primary winding 36 of a trigger transformer 30 are shown connected in the output circuit of the thyratron 140 between the cathode 48 and the anode 52. The lower terminal of the secondary winding 29 of the trigger transformer 30 is shown connected to the grounded conductor 12, and its upper terminal, by way of a conductor 54, to the control electrode 100.

A charging circuit for the trigger condenser 28 may be traced from the upper terminal of the secondary winding 147, through the rectifier 20, by way of the conductor 10, through the resistor 27, the condenser 28 and the primary winding 36 of the trigger transformer 30, to the grounded conductor 12 that connects with the lower terminal of the secondary winding 147.

The electrical stimulus or triggering impulse may be impressed upon the control electrode 100 by closing a switch 14 operable in response to the initiating operation of the shutter mechanism 15, by way of conductors 16 and 17. The conductor 17 is shown connected to the grounded conductor 12. The connections of conductor 16 will be described more fully hereinafter. The closing of the switch 14 triggers the thyratron 140 rendering it conductive. The condenser 28 thereupon discharges through the thyratron 140 and the primary winding 36 to produce a triggering voltage impulse that is applied through the secondary winding 29 to the control electrode 100, thereby to effect a discharge of the voltage developed upon the charged condensers 26 and 126 between the anode 6 and the cathode 4 of the flash-lamp 2. A high-intensity, very brief, flash of light is thereupon produced for momentarily illuminating an object to be photographed.

In accordance with the present invention, however, the thyratron control circuit can not be closed to produce the triggering-voltage impulse on the control electrode 100 of the flash-tube 2, until a predetermined interval of time after the closing of the switch 14. This is because a condenser 21, the lower or negative terminal of which is connected, through the resistor 24, to the control grid 50, and the upper terminal of which is connected to the grounded conductor 12, is normally negatively charged through the resistor 19 by the voltage appearing across the bleeder resistor 33. So long as the condenser 21 remains negatively charged, this negative or cut-off bias remains impressed upon grid 50, and the thyratron 140 can not, therefore, conduct.

Upon the closing of the switch 14 synchronously with the tripping of the shutter opening mechanism 15, however, a short circuit is established, by way of the conductors 16 and 17, across the combination of the resistor 19 and condenser 21. The condenser 21 thereupon starts to discharge its negative charge through the resistor 19 at a rate determined by the time constant of the electric network comprising the resistor 19 and the condenser 21. Upon the negative voltage charge of the condenser 21 becoming discharged, in accordance with this time constant, sufficiently to cause the grid 50 to become sufficiently positive with respect to the cathode 48, the tube 140 will become triggered, rendering it conductive. The condenser 28 will thereupon discharge through the tube 140, producing the before described triggering impulse on the control grid 100.

The time constant of the network 19, 21 is adjusted to correspond substantially to the time after the shutter mechanism 15 is set into operation that it takes the shutter mechanism 15 to open the shutter. By varying the resistance of the resistor 19, the time constant determining the predetermined interval of time of delay between the closing of the switch 14 and the triggering of the thyratron 140 and, therefore, the time of triggering of the flash-lamp 2, may be adjusted to correspond to different time delays for different shutter mechanisms 15.

As an illustration, with a type 5696 thyratron 140, a type FT-110 flash-lamp 2, an anode-to-cathode flash-lamp voltage across condensers 26 and 126 of about nine hundred volts, and a bleeder network 34, 33, 32, 31 of respectively about 2.2, 0.07, 1.0 and 1.0 megohms, an electric network having a resistance 19 of about 1.0 megohm and a capacitance 21 of about 0.01 microfarad will produce a delay of about fifteen microseconds. With the resistor 19 adjusted to a value of about 0.1 megohm, a delay of about five milliseconds may be produced.

Since the switch 14, like similar devices, often bounces open and closed, or chatters during closing, there is danger that the control circuit will not remain closed after the closing of the switch 14. With the reopening of this control circuit, of course, the network condenser 21 will cease discharging through the resistor 19, and the negative bias will not become removed from the control electrode 50.

In order to overcome this difficulty, in accordance with a feature of the present invention, means is provided, upon the switch 14 making an initial closing contact, for establishing and thereafter holding a substantial short-circuit across the network 19, 21.

Figure 2:
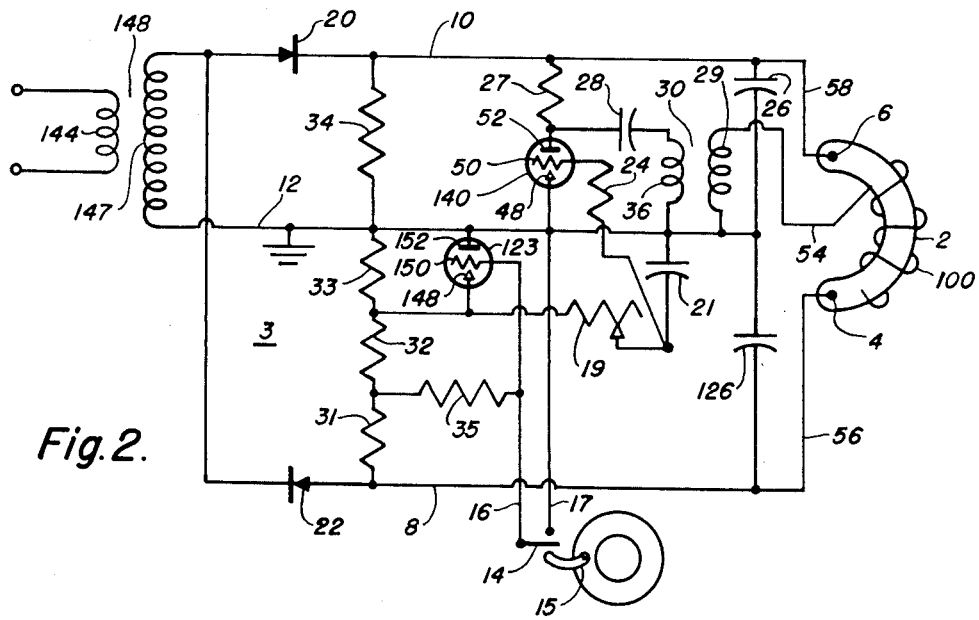

This means takes the form of a holding circuit that, as shown in Fig. 1, shunted across the bleeder resistor 33, may comprise a condenser 23. The condenser 23 is thus normally charged by the voltage across the bleeder resistor 33, providing an open circuit across the network 19, 21. The conductor 16 is shown, in Fig. 1, connected to the junction point between the bleeder resistor 33 and the condenser 23, thus providing very little resistance in shunt with the condenser 23 when the switch 14 becomes closed. Even a momentary closing of the switch 14, therefore, will effect the almost instantaneous discharge of the condenser 23, thus providing an effectively closed holding circuit across the network 19, 21 irrespective of possible chattering of the switch 14. The continuous discharge of the condenser 21 is theerfore not interfered with by such chattering of the switch 14.

Other types of holding circuits may also be employed. One such, for example, is illustrated by the thyratron 123 of Fig. 2. The cathode 148 of the thyratron 123 is shown connected to the lower terminal of the bleeder resistor 33, its control grid 150 to the conductor 16 and its plate or anode 152 to the grounded conductor 12. The control grid 150 is normally held negative with respect to the cathode 148 by means of a resistor 35 that is connected to the junction between the bleeder resistors 31 and 32 in order that the voltage across the bleeder resistor 32 may be applied between the control grid 150 and the cathode 148. The thyratron 123 is therefore normally non-conductive. Upon the switch 14 becoming initially closed, the grid 150 becomes connected to the anode 152 by way of the conductors 16 and 17. The thyratron 123 thereupon becomes conductive, and a discharge of current becomes established therethrough from the bleeder resistor 33, thereby closing a holding circuit similar to that described in connection with the condenser 23 of Fig. 1. The discharge of current through the thyratron 123 from the bleeder resistor 33 will continue irrespective of further opening of the switch 14, thus keeping this holding circuit closed. This enables the condenser 21 to continue discharging through the resistor 19 and the thyratron 123, to render the thyratron 140 conductive. The flash-tube 2 will not, therefore, flash until after the desired predetermined interval of time following upon the initial closing of the switch 14.

Since all the circuit elements are energized through a common power supply through the bleeder network 31, 32, 33, 34, the plate and grid voltages of the thyratron 140 of Fig. 1 and the thyratrons 123 and 140 of Fig. 2 vary proportionally with variations in applied voltage between successive flashes of the flashtube 2. By operating the thyratron 140 over a portion of its firing characteristic where the relation between the triggering or grid voltage and plate voltage is substantially linear, therefore, a constant delay is provided by the electric network 19, 21, for the triggering of the tube 140, even though the condensers 26 and 126 be not fully charged. An extremely reliable circuit is thus provided. Variations of applied voltage down to sixty or seventy percent of maximum voltage, have been found not to affect the reliability and accuracy of the time delay.

Though deemed highly preferable, it is not essential, of course, that a resistor 19 and a condenser 21 be employed as the electric time-delay network. In addition to resistance-capacitance networks, as further illustrations, resistance-inductance networks and inductance-capacitance networks, either in series or parallel relationship, may be employed for this purpose.

Further modifications will occur to those skilled in the art, and all such are considered to fall within the spirit and scope of the present invention, as defined in the appended claims.

What is claimed is:

1. For use with a camera having a normally closed shutter provided with a mechanism for delaying the opening of the shutter a predetermined interval of time, a flash-producing system having, in combination, a flash-lamp, condenser means, a charging circuit for charging the condenser means from a source of energy, a discharging circuit for discharging the condenser means through the flash-lamp to produce a flash of light for momentarily illuminating an object to be photographed, a normally ineffective electric-discharge device for triggering the discharge of the condenser means through the discharge circuit and the flash-lamp when the electric-discharge device is rendered effective, a switching device operable synchronously with the operation of the shutter-opening mechanism to trigger the electric-discharge device, an electric network having a time constant corresponding to the said predetermined time interval, means for supplying energy to the electric network, an electrical connection from the electric network to the electric-discharge device for applying bias to the electric-discharge device to maintain the device normally ineffective, and means for connecting the switching device to the electric network to alter the energy therein and thereby remove the bias applied to the electric-discharge device to render the device effective in accordance with the said time constant in order to effect the discharge of the condenser means through the discharging circuit and the flash-lamp at a equal to substantially the predetermined interval of time after the operation of the switching device in order that the flash may occur at a time when the shutter has become opened.

2. For use with a camera having a normally closed shutter provided with a mechanism for delaying the opening of the shutter a predetermined interval of time, a flash-producing system having, in combination, a flash-lamp, condenser means, a charging circuit for charging the condenser means from a source of energy, a discharging circuit for discharging the condenser means through the flash-lamp to produce a flash of light for momentarily illuminating an object to be photographed, a normally ineffective electric-discharge device for triggering the discharge of the condenser means through the discharge circuit and the flash-lamp when the electric-discharge device is renered effective, a switching device operable synchronously with the operation of the shutter-opening mechanism to trigger the electric-discharge device, an electric resistance-capacitance network having a time constant corresponding to the said predetermined time interval, means for supplying energy to the electric network, an electrical connection from the electric network to the electric-discharge device for applying bias to the electric-discharge device to maintain the device normally ineffective, and means for connecting the switching device to the electric network to alter the energy therein and thereby remove the bias applied to the electric-discharge device to render the device effective in accordance with the said time constant in order to effect the discharge of the condenser means through the discharging circuit and the flash-lamp at a time equal to substantially the predeterimined interval of time after the operation of the switching device in order that the flash may occur at a time when the shutter has become opened.

3. For use with a camera having a normally closed shutter provided with a mechanism for delaying the opening of the shutter a predetermined interval of time, a flash-producing system having, in combination, a flash-lamp, condenser means, a charging circuit for charging the condenser means from a source of energy, a discharging circuit for discharging the condenser means through the flash-lamp to produce a flash of light for momentarily illuminating an object to be photographed, a normally ineffective electric-discharge device for triggering the discharge of the condenser means through the discharge circuit and the flash-lamp when the electric-discharge device is rendered effective, a normally open control circuit for controlling the rendering effective of the electric-discharge device when closed, a switching device operable synchronously with the operation of the shutter-opening mechanism to close the control circuit, an electric network having a time constant corresponding to the said predetermined time interval, means for supplying energy to the electric network, an electrical connection from the electric network to the electric-discharge device for applying bias to the electric-discharge device to maintain the device normally ineffective, means for connecting the control circuit to the electric network to alter the energy therein and thereby remove the bias applied to the electric-discharge device to render the device effective in accordance with the said time constant, a normally open holding circuit, means effective upon the operation of the switching device to close the holding circuit to maintain the control circuit closed irrespective of the further operation of the switching device, and means for connecting the holding circuit with the electric network to insure the said removal of the bias applied to the electric-discharge device to render the device effective during a period of time corresponding to the said time constant in order to effect the discharge of the condenser means through the discharging circuit and the flash-lamp at a time equal to substantially the predetermined interval of time after the operation of the switching device in order that the flash may occur at a time when the shutter has become opened.

4. For use with a camera having a normally closed shutter provided with a mechanism for delaying the opening of the shutter a predetermined interval of time, a flash-producing system having, in combination, a flash-lamp, condenser means, a charging circuit for charging the condenser means from a source of energy, a discharging circuit for discharging the condenser means through the flash-lamp to produce a flash of light for momentarily illuminating an object to be photographed, a normally ineffective electric-discharge device for triggering the discharge of the condenser means through the discharge circuit and the flash-lamp when the electric-discharge device is rendered effective, a normally open control circuit for controlling the rendering effective of the electric-discharge device when closed, a switching device operable synchronously with the operation of the shutter-opening mechanism to close the control circuit, an electric network having a time constant corresponding to the said predetermined time interval, means for supplying energy to the electric network, an electrical connection from the electric network to the electric-discharge device for applying bias to the electric-discharge device to maintain the device normally ineffective, means for connecting the control circuit to the electric network to alter the energy therein and thereby remove the bias applied to the electric-discharge device to render the device effective in accordance with the said time constant, a normally open holding circuit comprising a normally charged condenser, means effective upon the operation of the switching device to close the holding circuit by discharging the condenser to maintain the control circuit closed irrespective of the further operation of the switching device, and means for connecting the holding circuit with the electric network to insure the said removal circuit with the electric network to insure the said removal of the bias applied to the electric-discharge device to render the device effective during a period of time corresponding to the said time constant in order to effect the discharge of the condenser means through the discharging circuit and the flash-lamp at a time equal to substantially the predetermined interval of time after the operation of the switching device in order that the flash may occur at a time when the shutter has become opened.

5. For use with a camera having a normally closed shutter provided with a mechanism for delaying the opening of the shutter a predetermined interval of time, a flash-producing system having, in combination, a flash-lamp, condenser means, a charging circuit for charging the condenser means from a source of energy, a discharging circuit for discharging the condenser means through the flash-lamp to produce a flash of light for momentarily illuminating an object to be photographed, a normally ineffective electric-discharge device for triggering the discharge of the condenser means through the discharge circuit and the flash-lamp when the electric-discharge device is rendered effective, a normally open control circuit for controlling the rendering effective of the electric-discharge device when closed, a switching device operable synchronously with the operation of the shutter-opening mechanism to close the control circuit, an electric network having a time constant corresponding to the said predetermined time interval, means for supplying energy to the electric network, an electrical connection from the electric network to the electric-discharge device for applying bias to the electric-discharge device to maintain the device normally ineffective, means for connecting the control circuit to the electric network to alter the energy therein and thereby remove the bias applied to the electric-discharge device to render the device effective in accordance with the said time constant, a normally open holding circuit comprising a normally non-conducting discharge tube, means effective upon the operation of the switching device to close the holding circuit by rendering the discharge tube conductive to maintain the control circuit closed irrespective of the further operation of the switching device, and means for connecting the holding circuit with the electric network to insure the said removal of the bias applied to the electric-discharge device to render the device effective during a period of time corresponding to the said time constant in order to effect the discharge of the condenser means through the discharging circuit and the flash-lamp at a time equal to substantially the predetermined interval of time after the operation of the switching device in order that the flash may occur at a time when the shutter has become opened.

6. For use with a camera having a normally closed shutter provided with a mechanism for delaying the opening of the shutter a predetermined interval of time, a flash-producing system having, in combination, a flash-lamp, condenser means, a charging circuit including a bleeder network for charging the condenser means from a source of energy, a discharging circuit for discharging the condenser means through the flash-lamp to produce a flash of light for momentarily illuminating an object to be photographed, a normally ineffective trigger device for triggering the discharge of the condenser means through the discharge circuit and the flash-lamp when effective, a switching device operable synchronously with the operation of the shutter-opening mechanism to trigger the trigger device, an electric network having a time constant corresponding to the said predetermined time interval, means for supplying energy to the trigger device and the electric network from the said bleeder network, an electrical connection from the electric network to the trigger device for applying bias to the trigger device to maintain the device normally ineffective, and means for connecting the switching device to the electric network to alter the energy therein and thereby remove the bias applied to the trigger device to render the device effective in accordance with the said time constant in order to effect the discharge of the condenser means through the discharging circuit and the flash-lamp at a time equal to substantially the predetermined interval of time after the operation of the switching device in order that the flash may occur at a time when the shutter has become opened.

7. An electric system having, in combination, a flash-lamp, a condenser means for discharging through the flash-lamp to produce a flash of light, a charging circuit for connecting the condenser means to a source of energy, a normally ineffective electric-discharge device for producing, when effective, the discharge of the condenser means through the flash-lamp, a switching device, a time-constant-controlled electric network having a time constant corresponding to a predetermined interval of time, means for supplying energy to the electric network, an electrical connection from the electric network to the electric-discharge device for applying bias to the electric-discharge device to maintain the device normally ineffective, and means for connecting the switching device to the electric network to alter the energy therein and thereby remove the bias applied to the electric-discharge device to render the device effective in accordance with the said time constant, in order to effect the rendering effective of the electric-discharge device the said predetermined interval of time after the operation of the switching device, thereby to delay the discharge of the condenser means through the flash-lamp and the resulting flash of light the said predetermined interval of time.

8. An electric system having, in combination, a flash-lamp, a condenser means for discharging through the flash-lamp to produce a flash of light, a charging circuit for connecting the condenser means, to a source of energy, a normally ineffective electric-discharge device for producing, when effective, the discharge of the condenser means through the flash-lamp, a normally open control circuit for rendering effective the electric-discharge device when closed, a switching device operable to close the control circuit, an electric network having a time constant corresponding to a predetermined time interval, means for supplying energy to the electric network, an electrical connection from the electric network to the electric-discharge device for applying bias to the electric-discharge device to maintain the device normally ineffective, means for connecting the control circuit to the electric network to alter the energy therein and thereby remove the bias applied to the electric-discharge device to render the device effective in accordance with the said time constant, a normally open holding circuit, means effective upon the operation of the switching device to close the holding circuit to maintain the control circuit closed irrespective of the further operation of the switching device, and means for connecting the holding circuit with the electric network to insure the said removal of the bias applied to the electric-discharge device to render the device effective during a period of time corresponding to the said time constant in order to effect the rendering effective of the electric-discharge device the said predetermined interval of time after the operation of the switching device, thereby to delay the discharge of the condenser means through the flash-lamp and the resulting flash of light the said predetermined interval of time.

9. An electric system having, in combination, a flash-lamp, a condenser means for discharging through the flash-lamp to produce a flash of light, a charging circuit for connecting the condenser means to a source of energy, a normally ineffective electric-discharge device for producing, when effective, the discharge of the condenser means through the flash-lamp, a normally open control circuit for rendering effective the electric-discharge device when closed, a switching device operable to close the control circuit, an electric network having a time constant corresponding to a predetermined time interval, means for supplying energy to the electric network, an electrical connection from the electric network to the electric-discharge device for applying bias to the electric-discharge device to maintain the device normally ineffective, means for connecting the control circuit to the electric network to alter the energy therein and thereby remove the bias applied to the electric-discharge device to render the device effective in accordance with the said time constant, a normally open holding circuit comprising a normally charged condenser, means effective upon the operation of the switching device to close the holding circuit by discharging the condenser to maintain the control circuit closed irrespective of the further operation of the switching device, and means for connecting the holding circuit with the electric network to insure the said removal of the bias applied to the electric-discharge device to render the device effective during a period of time corresponding to the said time constant in order to effect the rendering effective of the electric-discharge device the said predetermined interval of time after the operation of the switching device, thereby to delay the discharge of the condenser means through the flash-lamp and the resulting flash of light the said predetermined interval of time.

10. An electric system having, in combination, a flash-lamp, a condenser means for discharging through the flash-lamp to produce a flash of light, a charging circuit for connecting the condenser means to a source of energy, a normally ineffective electric-discharge device for producing, when effective, the discharge of the condenser means through the flash-lamp, a normally open control circuit for rendering effective the electric-discharge device when closed, a switching device operable to close the control circuit, an electric network having a time constant corresponding to a predetermined time interval, means for supplying energy to the electric network, an electrical connection from the electric network to the electric-discharge device for applying bias to the electric-discharge device to maintain the device normally ineffective, means for connecting the control circuit to the electric network to alter the energy therein and thereby remove the bias applied to the electric-discharge device to render the device effective in accordance with the said time constant, a normally open holding circuit comprising a normally non-conducting discharge tube, means effective upon the operation of the switching device to close the holding circuit by rendering the discharge tube conductive to maintain the control circuit closed irrespective of the further operation of the switching device, and means for connecting the holding circuit with the electric network to insure the said removal of the bias applied to the electric-discharge device to render the device effective during a period of time corresponding to the said time constant in order to effect the rendering effective of the electric-discharge device the said predetermined interval of time after the operation of the switching device, thereby to delay the discharge of the condenser means through the flash-lamp and the resulting flash of light the said predetermined interval of time.

11. For use with a camera having a normally closed shutter provided with mechanism for delaying the opening of the shutter a predetermined interval of time, a flash-producing system having, in combination, a flash-lamp for producing a flash of light in order momentarily to illuminate an object to be photographed, condenser means, means for charging the condenser means, a normally non-conductive gaseous-discharge tube, a switching device operable synchronously with the operation of the shutter-opening mechanism, an electric network having a time constant corresponding to the said predetermined interval of time, means for supplying energy to the electric network, an electrical connection from the electric network to the tube for applying bias to the tube to maintain the tube normally non-conductive, and means for connecting the switching device to the network to alter the energy therein and thereby to remove the bias applied to the tube to render the tube conductive in accordance with the said time constant in order to effect the rendering of the tube conductive during the said predetermined interval of time, and means controlled by the tube upon its becoming conductive for discharging the condenser means through the flash-lamp.

12. For use with a camera having a normally closed shutter provided with mechanism for delaying the opening of the shutter a predetermined interval of time, a flash-producing system having, in combination, a flash-lamp for producing a flash of light in order momentarily to illuminate an object to be photographed, first and second condenser means, means for charging the condenser means, a normally non-conductive gaseous-discharge tube, a switching device operable synchronously with the operation of the shutter-opening mechanism, an electric network having a time constant corresponding to the said predetermined interval of time, means for supplying energy to the electric network, an electrical connection from the electric network to the tube for applying bias to the tube to maintain the tube normally non-conductive, and means for connecting the switching device to the network to alter the energy therein and thereby to remove the bias applied to the tube to render the tube conductive in accordance with the said time constant in order to effect the rendering of the tube conductive during the said predetermined interval of time, means for discharging the second condenser means through the tube upon the tube becoming conductive, and means controlled by the discharge of the second condenser means through the tube for discharging the first condenser means through the flash-lamp.

13. For use with a camera having a normally closed shutter provided with mechanism for delaying the opening of the shutter a predetermined interval of time, a flash-producing system having, in combination, a flash-lamp for producing a flash of light in order momentarily to illuminate an object to be photographed, condenser means, means for charging the condenser means, a gaseous-discharge tube, an electric network, means for charging the electric network to a voltage sufficient to bias the tube normally to cut-off, means for connecting the electric network to the tube to apply the cut-off bias voltage thereto, the electric network having a time constant corresponding to the said predetermined interval of time, a switching device operable synchronously with the operation of the shutter-opening mechanism for discharging the electric network in accordance with the said time constant, thereby to delay the removal of the said bias voltage and the rendering conductive of the tube during the said predetermined interval of time, and means controlled by the tube upon its becoming conductive for discharging the condenser means through the flash-lamp.

14. For use with a camera having a normally closed shutter provided with a mechanism for delaying the opening of the shutter a predetermined interval of time, a flash-producing system having, in combination, a flash-lamp, condenser means, a charging circuit including a bleeder network for charging the condenser means from a source of energy, a discharging circuit for discharging the condenser means through the flash-lamp to produce a flash of light for momentarily illuminating an object to be photographed, a normally non-conductive gaseous-discharge tube for triggering the discharge of the condenser means, when conductive, through the discharge circuit and the flash-lamp, a switching device operable to render the gaseous-discharge tube conductive, an electric network having a time constant corresponding to the said predetermined time interval, means for supplying energy to the gaseous-discharge tube and the electric network from the said bleeder network, means for connecting the electric network to the gaseous-discharge tube to bias the same to cut-off, and means for connecting the switching device to the electric network to alter the energy therein and to remove the cut-off bias applied to the gaseous-discharge tube in accordance with the said time constant in order to delay the rendering conductive of the gaseous-discharge tube and the discharge of the condenser means through the discharging circuit and the flash-lamp for substantially the predetermined interval of time after the operation of the switching device in order that the flash may occur at a time when the shutter has become opened.

15. For use with a camera having a normally closed shutter provided with mechanism for delaying the opening of the shutter a predetermined interval of time, a flash-producing system having, in combination, a flash-lamp for producing a flash of light in order momentarily to illuminate an object to be photographed, condenser means, a source of energy, means for charging the condenser means from the source of energy, a gaseous-discharge tube, a series-connected resistance-capacitance electric network, means for charging the electric network from the said source of energy to a voltage sufficient to bias the tube to cut-off, a further resistor connecting the point of series connection of the resistance and capacitance of the electric network to the tube to apply the cut-off bias voltage thereto, the electric network having a time constant corresponding to the said predetermined interval of time, a switching device operable synchronously with the operation of the shutter-opening mechanism for shunting the electric network to discharge the same in accordance with the said time constant, thereby to delay the removal of the said bias voltage and the rendering conductive of the tube during the said predetermined interval of time, and means controlled by the tube upon its becoming conductive for discharging the condenser means through the flash-lamp.

16. For use with a camera having a normally closed shutter provided with mechanism for delaying the opening of the shutter a predetermined interval of time, a flash-producing system having, in combination, a flash-lamp for producing a flash of light in order momentarily to illuminate an object to be photographed, condenser means, a source of energy, means for charging the condenser means from the source of energy, a gaseous-discharge tube, an electric network, means for charging the electric network from the said source of energy to a voltage sufficient to bias the tube to cut-off, means for connecting the electric network to the tube to apply the cut-off bias voltage thereto, the electric network having a time constant corresponding to the said predetermined interval of time, a switching device operable synchronously with the operation of the shutter-opening mechanism for shunting the electric network to discharge the electric network in accordance with the said time constant, thereby to delay the removal of the said bias voltage and the rendering conductive of the tube during the said predetermined interval of time, an electric impedance connected in shunt with the electric network, means for controlling the impedance to cause it to assume a relatively high-impedance value in the absence of operation of the switching device and a relatively low-impedance value upon operation of the switching device in order to provide a reliable discharge path for the electric network irrespective of possible chattering of the switching device, and means controlled by the tube upon its becoming conductive for discharging the condenser means through the flash-lamp.

17. For use with a camera having a normally closed shutter provided with mechanism for delaying the opening of the shutter a predetermined interval of time, a flash-producing system having, in combination, a flash-lamp for producing a flash of light in order momentarily to illuminate an object to be photographed, condenser means, a source of energy, means for charging the condenser means from the source of energy, a gaseous-discharge tube, an electric network, means for charging the electric network from the said source of energy to a voltage sufficient to bias the tube to cut-off, means for connecting the electric network to the tube to apply the cut-off bias voltage thereto, the electric network having a time constant corresponding to the said predetermined interval of time, a switching device operable synchronously with the operation of the shutter-opening mechanism for shunting the electric network to discharge the electric network in accordance with the said time constant, thereby to delay the removal of the said bias voltage and the rendering conductive of the tube during the said predetermined interval of time, a normally charged further condenser connected in shunt with the electric network and adapted to discharge upon the operation of the switching device in order to provide a reliable discharge path for the electric network irrespective of possible chattering of the switching device, and means controlled by the tube upon its becoming conductive for discharging the condenser means through the flash-lamp.

18. For use with a camera having a normally closed shutter provided with mechanism for delaying the opening of the shutter a predetermined interval of time, a flash-producing system having, in combination, a flash-lamp for producing a flash of light in order momentarily to illuminate an object to be photographed, condenser means, a source of energy, means for charging the condenser means from the source of energy, a gaseous-discharge tube, an electric network, means for charging the electric network from the said source of energy to a voltage sufficient to bias the tube to cut-off, means for connecting the electric network to the tube to apply the cut-off bias voltage thereto, the electric network having a time constant corresponding to the said predetermined interval of time, a switching device operable synchronously with the operation of the shutter-opening mechanism for shunting the electric network to discharge the electric network in accordance with the said time constant, thereby to delay the removal of the said bias voltage and the rendering conductive of the tube during the said predetermined interval of time, a normally non-conductive further gaseous-discharge tube connected in shunt with the electric network and adapted to conduct upon the operation of the switching device in order to provide a reliable discharge path for the electric network irrespective of possible chattering of the switching device, and means controlled by the first-named tube upon its becoming conductive for discharging the condenser means through the flash-lamp.

(References on following page)

References Cited in the file of this patent

UNITED STATES PATENTS

| | | |
|---|---|---|
| 2,324,075 | Gillon et al. | July 13, 1943 |
| 2,509,005 | Lord | May 23, 1950 |
| 2,622,229 | Lord | Dec. 16, 1952 |

OTHER REFERENCES

"Flash" (Edgerton and Killian), published by Hale, Cushman & Flint, Boston, 1939, page 194.